May 28, 1968
J. E. EYNON
3,385,333
VERTICAL LOGGING MACHINE
Filed Oct. 18, 1965
4 Sheets-Sheet 1
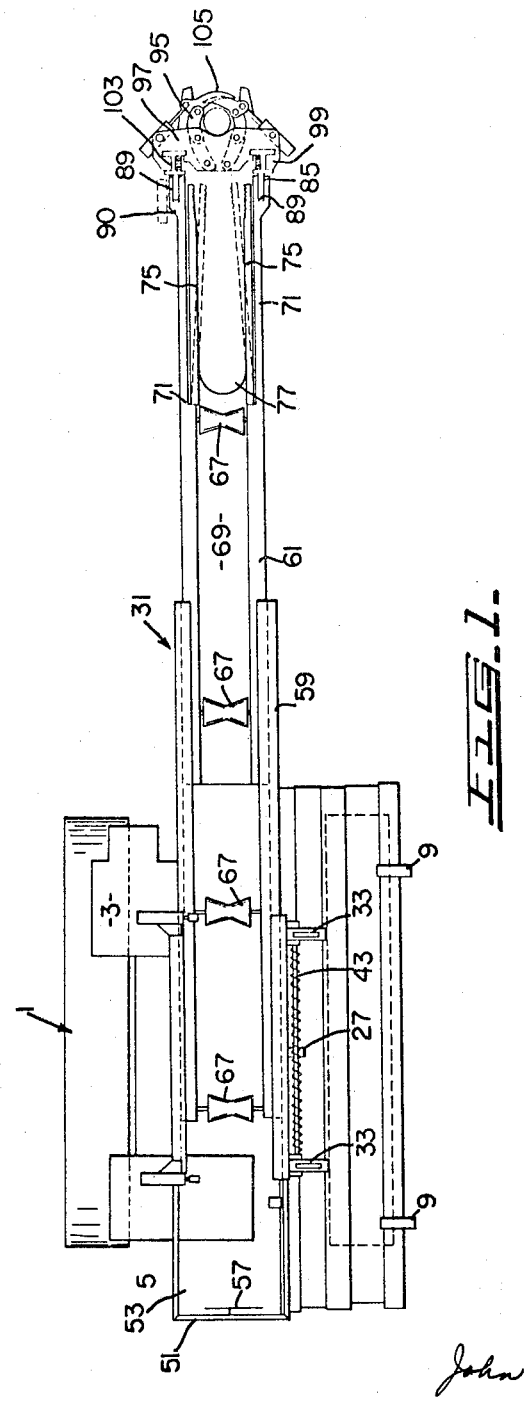

May 28, 1968
J. E. EYNON
3,385,333
VERTICAL LOGGING MACHINE
Filed Oct. 18, 1965
4 Sheets-Sheet 2
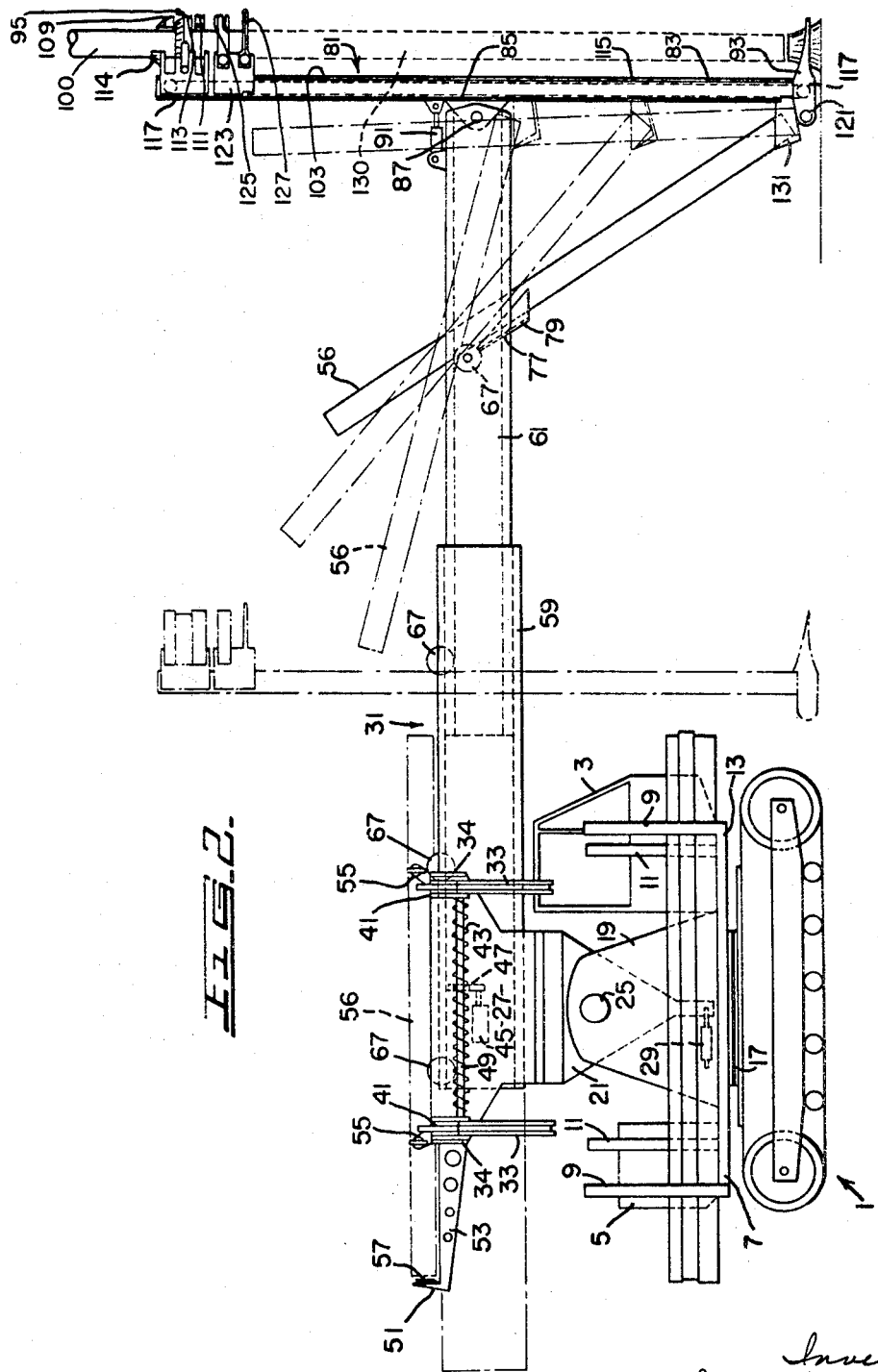

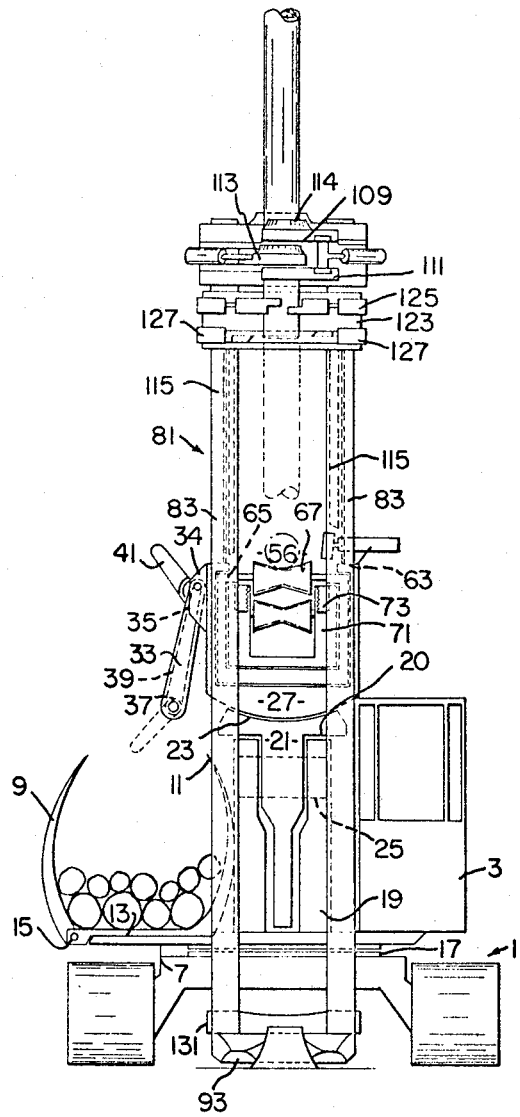

May 28, 1968  J. E. EYNON  3,385,333
VERTICAL LOGGING MACHINE
Filed Oct. 18, 1965  4 Sheets-Sheet 4
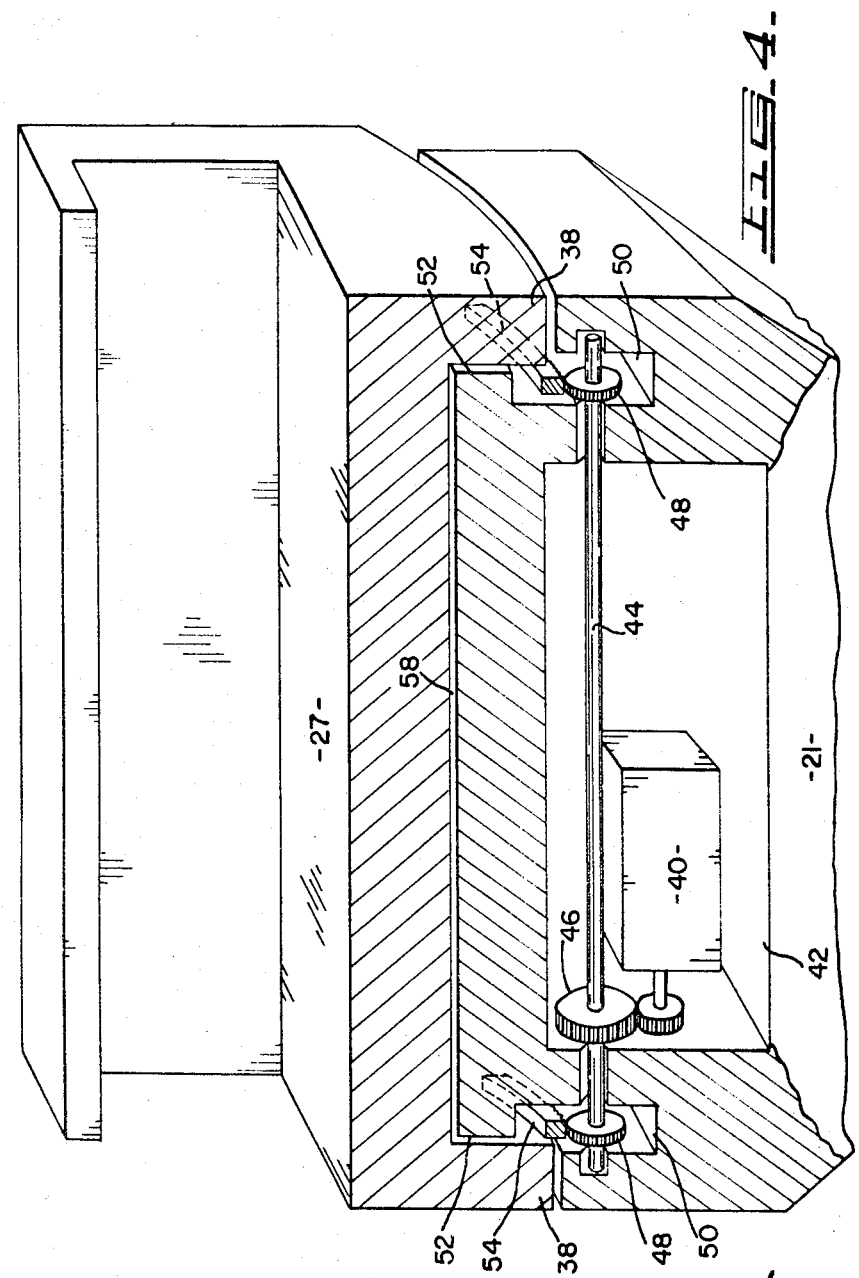
Inventor
John E. Eynon
By Cushman, Darby & Cushman
Attorneys United States Patent Office 3,385,333
Patented May 28, 1968

3,385,333
VERTICAL LOGGING MACHINE
John E. Eynon, Port Arthur, Ontario, Canada, assignor to Abitibi Power & Paper Company Limited, Iroquois Falls, Ontario, Canada, a corporation of Canada
Filed Oct. 18, 1965, Ser. No. 496,986
Claims priority, application Canada, Oct. 28, 1964, 915,079
13 Claims. (Cl. 144—309)

ABSTRACT OF THE DISCLOSURE

A logging machine for processing a tree, in a vertical position, into bolts of predetermined length without previous felling of said tree which machine comprises shearing means adapted for vertical traverse between a first position adjacent the bottom of the tree for butt shearing and a second position spaced from the first position by said predetermined length for subsequent bolt shearing means for transferring the bolts to a conveyor and means for delimbing the tree operative upon relative movement between the delimbing means and said tree, the shearing means, and the delimbing means both including means engageable to grip the tree.

---

This invention relates to a logging machine and in particular to a machine for processing trees while they are in a vertical position.

There are presently available machines for processing trees, i.e., felling trees, delimbing them, and cutting them into bolts of lengths suitable for transfer to a treatment plant or mill. The majority of the most recent machines are adapted to perform several of the above steps in a more or less efficacious manner. It will be appreciated that the cost of transporting a tree from the point of felling to a mill is proportional to the weight of the tree when it leaves the felling site. In other words it is desirable to discard as much of the unusable portion of a tree, such as limbs, before transporting the tree to a landing or mill.

Furthermore, when cutting a stand of timber, selected trees are left uncut, these constituting what is commonly known as the residual stand. A residual stand can consist of valuable immature trees which should not be damaged, or select trees which for silvicultural reasons it is desirable to leave standing, or trees that, because of species or condition, are considered commercially undesirable. Generally working a stand of timber presents problems due to the residual stand, and in particular, that of working around trees of the last category mentioned above. When working in a stand of timber containing many such undesirable trees the problem confronted is that of working around these trees without wasting the time and energy necessary to cut down and remove the trees.

The majority of the presently available tree processing machines are brought into use only after a tree has been felled, at which time damage may already have been done to the residual stand. Even after a tree has been felled there remains the problem of transferring a trunk laden with branches from the ground over or around the residual stand to a processing machine. This may involve the lifting or dragging of the tree through a considerable distance.

The object of the present invention is to alleviate the above-mentioned problems by providing a logging machine adapted to process trees into bolts of predetermined lengths while maintaining the tree in an upright position.

Accordingly the present invention relates to a logging machine for mounting on a support vehicle and adapted to process trees into bolts of predetermined lengths, which machine includes means for gripping and delimbing a tree; means for gripping and cutting said tree into said bolts; conveyor means for conveying said bolts along a selected path; and means for transferring said bolts to said conveyor means.

The invention will now be described in detail with reference to the accompanying drawings, which show, by way of example, a preferred embodiment of the invention, and wherein:

FIGURE 1 is a plan view of a logging machine constructed in accordance with the present invention;

FIGURE 2 is a side view of the logging machine of FIGURE 1 showing the various positions that can occupied by some of its components in phantom outline;

FIGURE 3 is a front view of the logging machine of FIGURE 1, and

FIGURE 4 is a cross-section view of the boom carriage and carrier of FIGURE 1 illustrating one form of means for rotating the carrier in the carriage.

For the sake of clarity, first the structure and then the operation of the logging machine is described.

STRUCTURE

With reference to the drawings, reference number 1 indicates a support vehicle which can be of the conventional tracked type having a cab 3 on one side of the top thereof, and an engine or engines disposed in an engine housing 5. It will be appreciated that the support vehicle could be replaced by a stationary base, but this is not advisable since it considerably limits the range of the machine and necessitates frequent moving of the machine. The engine housing 5 preferably contains hydraulic pumps and any other components required to operate the machine.

A log cradle 7 is also provided on the top of the vehicle 1 and, as best shown in FIGURE 3, includes arcuate upwardly extending side arms 9 and 11 and a floor portion 13. The arms 9 and 11 are pivotable and can be drawn together by means of hydraulic cylinders (not shown) to squeeze a load of bolts. The arms 9 and the floor portion 13 of the cradle 7 are pivotable about shaft 15 so that the cradle 17 can be tilted to drop the bolts retained therein. The tipping of the cradle 7 can be achieved by any suitable means, such as for example, a hydraulic cylinder mounted beneath the floor portion 13.

A base plate 17 rotatably mounted on the top of the vehicle 1 provides a support on which a bracket 19 and the cab 3 are mounted for rotation. A carriage 21 having an arcuate upper end 23 is pivotally mounted on a shaft 25 within the bracket 19 and supports a boom carrier 27. A hydraulic cylinder 29 is provided adjacent the lower end of the carriage 21 for tilting the latter. The boom carrier 27 is provided with an arcuate base 30 for mating with the upper end 23 of the carriage 21, so that the carrier 27 is rotatable with respect to the carriage 21 in the directions indicated by arrows A. The rotation of the carrier 27 in the carriage 21 is accomplished by any suitable means, such as for example, by means of a ratchet and pinion arrangement (not shown) driven by a hydraulic motor or by means of the arrangement shown in FIGURE 4 of the drawings, wherein the front and back edges of the carrier 27 are provided with downwardly depending flanges 38. A hydraulic motor 40 mounted in a pocket 42 in the carriage 21 drives a shaft 44 through gear train 46. A pinion 48 mounted adjacent each end of the shaft 44 in a recess 50 in the end walls 52 of carriage 21 is in toothed engagement with ratchet 54 mounted on the interior end wall of a groove 58 in the base of carrier 27. Thus the actuation of motor 40 results in the rotation of carrier 27 relative to the carriage 21.

A boom, generally indicated at 31, is slidably mounted in the carrier 27, which as mentioned above, is rotatably mounted on the carriage 21 so that the boom can be rotated about its longitudinal axis.

A pair of log feed arms 33 are mounted in brackets 34 on one side of the boom carrier 27 and extend downwardly toward the log cradle 7. The feed arms 33 are hollow and are provided at each end with a driven gear 35 and an idler gear 37, the gears 35 and 37 being interconnected by an endless chain 39. A log descent control arm 41 is secured to each of the chains 39 and is slidable in the log feed arms 33. A shaft 43 for driving the gears 35 extends between the gears 35 and is driven by any suitable means, such as for example, that shown in phantom outline in FIGURE 2 of the drawings, and including a motor 45 connected to the shaft 43 by means of gear train 47. The actuation of the motor 45 drives the control arms 41 down the feed arms 33 to the position shown in phantom outline in FIGURE 3. A helical spring 49 ensures that the shaft 43 ensures that the control arms 41 return to the top of the feed arms 33.

A stop plate 51 is provided on a rearwardly extending projection 53 of the boom carrier 27 for preventing bolts being conveyed along the top of the boom 31 from falling off the end of the boom. Also, mounted on the boom carirer 27 are a pair of hydraulically operated kick-off mechanisms 55 for knocking a bolt 56 from the top of the boom onto the log feed arms 33 from whence it is fed into the cradle 7. The kick-off mechanisms 55 are automatically actuated when a bolt strikes a switch 57 extending forwardly on the front face of the stop plate 51. This can be achieved by means of a solenoid oil valve (not shown) actuated by the switch 57, the former controlling the supply of fluid to the hydraulic kick-off mechanisms 55.

The boom 31 is made up of two sections 59 and 61 the former of which is, as mentioned, slidably mounted in the boom carrier 27. The boom carrier 27 and the boom sections 59 and 61 are all of U-shaped cross section. The carrier 27 is provided with inwardly extending opposed flanges 63 to retain boom section 59 and the latter is provided with similar flanges 65 to retain section 61. Suitable rollers and drive means are provided between the carrier 27 and boom sections 59 and 61 to permit sliding of the boom section 59 in the carrier 27 and of the boom section 61 in the section 59. Thus when the boom 31 is in its retracted position, as shown in phantom outline in FIGURE 2 of the drawings, the center of gravity of the vehicle is close to the dimensional center of the support vehicle.

A plurality of rollers 67 are mounted on the boom sections 59 and 61 for conveying a bolt along the boom 31. The rollers 67 can be independently or jointly driven by any suitable means such as for example pulleys and V-belts, or by gears and chains, connecting the rollers 67 to a prime mover contained in engine housing 5. As best shown in FIGURES 1 and 3 of the drawings each of the rollers 67 is preferably in the form of a pair of truncated cones joined to provide a roller having a groove at its center thereby ensuring that bolts conveyed along the boom 31 by the rollers 67 do not fall off the boom. It will be appreciated that other forms of rollers may be used to accomplish the same thing as the above described rollers.

The outer boom section 61 is provided with a bottom wall 69 and relatively thick side walls 71 the latter of which are each provided with a shoulder portion 73 on which is mounted a pair of bolt retractor arms 75 adjacent the free end of the boom section 61. The bolt retractor arms 75 are slidably mounted on the shoulder portions 73 and can be driven by any suitable means such as for example, hydraulic cylinders. The retractor arms 75 are thus extensible out beyond the free end of the boom section 61. Means are also provided for closing the retractor arms 75, i.e., for bringing the arms together. Such means could include a linkage between the arms, or between each arm and the side walls 71.

The bottom wall 69 is provided with an arcuate slot 77 adjacent the free end of the boom section 61 permitting the entry of bolts between the side walls 71 of the boom section. An angled stop plate 79 is secured to the inner end of the slot 77 for cushioning bolts drawn into the slot and guiding bolts to the rollers 67. The stop plate 79 also enables the machine to be used with relatively short bolts, the stop plate catching the top of a bolt which falls short of the first roller 67 and guiding the bolt onto the rollers.

A slashing track, generally indicated at 81, is pivotally mounted on the free end of the boom section 61. The slashing track 81 includes a pair of spaced H-beams 83 pivotally mounted on the free end of boom section by means of triangular plates 85 which are connected to the H-beams and mounted on pins 87 in slots 89 formed in the enlarged ends 90 of side walls 71 of boom section 61. A hydraulic cylinder 91 mounted on side wall 71 of boom section 61 controls the pivoting of the slashing track relative to the boom. The bottom ends of the H-beams 83 are connected together by means of a forked toe plate 93 which aids in the positioning of the slashing track 81 relative to a tree 100.

The H-beams 83 are further connected together by means of a delimbing head 95 which is freely, slidably mounted on the slashing track 81 and includes a yoke portion 97 the extremities 99 of which project into the outer groove 103 of each of the H-beams 83 to maintain the delimbing head 95 on the slashing track 81. The delimbing head 95 further includes a hydraulically operated jaw 105 which is capable of completely encircling the tree 100. The jaw 105 is formed with a pair of arms 109 and 111 on one side which when the jaw is closed lie above and below the single arm 113 on the other side of the jaw. The upper edges of jaw arms 109 and 113 are provided with sharpened upwardly extending edges 114 for delimbing a tree when the latter is drawn downwardly through the arms of the jaw. A catch means (not shown) is provided on the slashing track adjacent its upper end to engage the delimbing head 95.

An endless chain 115 extending the length of the slashing track 81 is mounted on gears 117 disposed in the inner groove 119 of each of the H-beams 83 adjacent their top or bottom ends. The chain 115 is driven about the gears 117 by any suitable means, such as for example, a hydraulic motor connected to the slashing track at 121.

A shearing head 123 is mounted on the slashing track in the same manner as the delimbing head 95, and is connected to the chains 115 so that the shearing head can be driven along the length of the slashing track 81. The shearing head 123 includes a ram actuated jaw 125 and blades 127, the latter being adapted to shear the trunk or bole 130 of the tree 100.

A bucket 131 is slidably mounted on the back side of the slashing track 81 and extends between the H-beams 83. The bucket 131 includes means (not shown) for engaging the shearing head 123 so that the latter will draw the bucket along the slashing track 81 when the shearing head is driven upwardly along the track by chains 115. A trip means (not shown) is provided adjacent the pivot point of the slashing track 81 to release the bucket 131 as the shearing head 123 rises above that point.

OPERATION

At the beginning of the operation the slashing track 81 is positioned adjacent a tree 100 to be processed, with the forked toe plate 93 disposed against the base of the tree, as near to the ground as desired. The positioning of the slashing track 81 is facilitated by the fact that the track is pivotable about the boom, and the latter can be rotated vertically and horizontally with respect to the support vehicle 1 as well as rotated about its own longitudinal axis by virtue of the manner in which boom carrier 27 is mounted in the carriage 21. Thus when a tree to be processed is angled, or located on the side of a hill, or in a gulley, the slashing track 81 can be manipulated to properly position it relative to the tree for processing.

When the slashing track 81 has been properly positioned relative to a tree the shearing head 123 and delimbing head 95 are at the bottom of the track in a fully opened position. The track 81 is tilted back slightly from the vertical and the trunk of the tree is engaged adjacent the ground by the jaws 105, 125 on the delimbing head 95 and the shearing head 123 respectively, the jaws being closed to encircle the tree, but not to grip it so tightly that the delimbing and shearing heads can not be moved up the slashing track 81 without severely damaging the trunk or uprooting the tree.

The delimbing head 95 is then moved up the trunk by actuating the chain drive of shearing head 123, the latter driving the delimbing head up the track. As the delimbing head 95 rises up the track 81 it delimbs the tree since the sharpened upper edges 114 of the delimbing jaws 105 are being moved against the tree limbs. Upon reaching the top of the slashing track 81 the delimbing head is locked in position securely holding the tree trunk. The shearing head 123 is returned to the bottom of the track 81 where the blades 127 are closed to shear the tree adjacent its base.

The shearing head 123 is returned to the top of the slashing track 81 below the delimbing head 95. As the shearing head passes the track pivot point, the log retractor arms 75 are extended outwardly between the H-beams 83 and closed to seize the tree bole. Upon reaching the top of the slashing track 81, the jaws 125 are again closed to grip the tree bole above the blades 127, the latter being subsequently closed to shear the tree bole. As the second shearing action is completed, the log retractor arms 75 draw the cut bolt 56 between the H-beams 83 into the slot 77 in the bottom wall 69 of boom section 61, the bottom of the bolt sliding into the bucket 131.

The shearing head 123 engaging the tree is returned to the bottom of the slashing track 81 drawing the tree downwardly to adjacent the toe plate 93. During this downward movement of the tree through the delimbing head 95 the branches of the tree are severed by the sharpened upper edges 114 of the delimbing jaws.

The shearing head 123 engages the bucket 131 and returns to the top of the slashing track 81. As the shearing head rises along the slashing track 81, the bucket 131 also rises carrying the bolt 56 upwardly and depositing it on the driven rollers 67. The bucket 131 is tripped at the pivot point of the slashing track and falls back to the bottom of the slashing track in position to receive another bolt. It will be appreciated that the bucket 131 rises along the slashing track 81 each time the shearing head 123 comes in contact with and engages it, but the only time it serves a useful purpose is when a bolt is resting in the bucket.

The bolt 56 is transported along the rollers 67 to the rear of the boom 31 where it strikes the switch 57 thus automatically actuating the kick-off mechanisms 55 which eject the bolt 56 onto the log feed arms 33. The bolt descends along the log feed arms 33, the rate of travel of the bolt being controlled by the control arms 41.

Meanwhile, the shearing head 123 has returned to the top of the slashing track 81 to repeat the above cycle as required to process the remainder of the tree.

Once a tree has been severed at its base and gripped by the jaws of the delimbing head the boom and slashing track can be moved into position adjacent a new tree to be processed. Thus, as soon as the processing of the first tree is completed, work can begin on a second tree.

As soon as the cradle 7 becomes filled with a predetermined quantity of bolts, the bolts are compressed by the cradle arms 9 and 11 to compact the bundle thereby facilitating choking with pre-formed cable loops or automatic strapping or banding of the bundle. The bundle of bolts thus formed is dropped on the ground ready for transporting to a landing or mill.

When all of the trees within the range of the boom 31 have been processed the support vehicle is moved forward to bring into range a new group of trees.

It will be appreciated that the present logging machine is equipped to handle trees having a moderate degree of crookedness or sweep, since at the beginning of a tree cycle when the delimbing head 95 and shearing head 123 are adjacent the base of a tree, the delimbing jaws only are required to close. The jaws of the shearing head need not be closed until immediately prior to the shearing of the bole. If the jaws of the shearing head firmly encircled the tree bole, on the downward travel immediately prior to the first shearing action, binding would result if the bole was curved. Once the trunk or bole has been first sheared, a crooked trunk presents no problem insofar as drawing the trunk down through the delimbing head is concerned, since the trunk can rotate or move laterally as it passes through the delimbing head. In order to ensure that a crooked bolt passes between the H-beams 83 deflector plates could be provided on both of the beams and the bolt would be able to rotate in the log retractor arms to slide between the H-beams. There is also the danger of crooked bolts falling off the boom when being conveyed therealong by rollers 67. Further guide plates could be provided on the boom for preventing the dislodgement of bolts from the boom.

It will be appreciated that the length of the bolts produced by the log processing machine can be easily varied depending on whether the logs are to be used for the pulp and paper industry or for the lumber industry. The minimum length of bolt which can be handled by the machine of the present invention is determined by the distance between the bucket 131 when it is in a rest position at ground level and the lower edge of the angled stop plate 79.

I claim:

1. A method of processing a tree into bolts of predetermined lengths while maintaining said tree in vertical position, said method comprising the steps of gripping said tree; delimbing a first portion of said tree adajcent its base; shearing said tree adjacent its base; shearing said tree adjacent the upper end of said first portion to produce said bolt of predetermined length; advancing the remainder of said tree downwardly whereby to simultaneously delimb a second section of said tree; shearing said second section of said tree adjacent its upper end to produce a second bolt, successively advancing with automatic delimbing further sections of said tree and shearing said further sections until the tree has been completely processed.

2. A logging machine adapted to process a tree into bolts of predetermined length, said machine comprising shearing means adapted to be positioned adjacent to the bottom of said tree for butt shearing and to be traversed to a position spaced from the bottom of the tree for bolt shearing means for transferring severed bolts to a conveyor, means for delimbing the tree operative upon relative movement occurring between said delimbing means and said tree, said shearing means and said means for delimbing the tree both including means engageable to grip the tree.

3. A machine as in claim 2 comprising a supporting boom and a slasher track at the end of said boom, said slasher track having universal movement so that it can be aligned substantially parallel to said tree and said shearing means and means for delimbing being movable along said slasher track.

4. A machine as in claim 3 comprising a carriage, said boom being mounted in said carriage so that the boom can be extended and retracted.

5. A method of processing a tree into bolts of predetermined lengths while maintaining said tree in a vertical position comprising the steps of delimbing a selected portion of said tree, shearing the tree at each end of the selected portion by successive operations of the same shear to form a bolt and then successively delimbing additional portions of the tree and shearing the tree to separate such additional portions into bolts.

6. A logging machine adapted to process a tree into bolts of predetermined length, said machine comprising a substantially vertical slasher track, shearing means adapted to move along said track between a first position adjacent the bottom of the tree for butt shearing and a second position spaced from the first position by said predetermined length for bolt shearing, means for removing the severed bolt to a conveyor, delimbing means, including releasable tree gripping means, adapted to move along said track whereby to delimb said tree, said delimbing means being located in said track above said shearing means, and said shearing means including releasable tree gripping means whereby to grip the free lower end of said tree, after removal of said bolt, and during its subsequent downward movement along said track pull said tree through said delimbing means.

7. A machine as claimed in claim 6 in which the movement of the delimbing means along the track is effected by movement of the shearing means along said track.

8. A machine as claimed in claim 6 in which the means for removing a severed bolt to a conveyor includes means for transferring said bolt from a vertical to a horizontal position for passage along a horizontal conveyor.

9. A machine as claimed in claim 6 in which said slasher track is pivotally mounted on the end of an extensible boom for movement about a transverse horizontal axis.

10. A machine as claimed in claim 9 in which the boom is slidably mounted in a carriage, said carriage being lockably rotatable in a mounting about the longitudinal axis of said boom and said mounting being pivotable about a horizontal axis transverse to said boom to provide for vertical movement of said boom.

11. A machine as claimed in claim 10 in which conveying means for said severed bolt is located on the upper face of the boom and carriage.

12. A machine as claimed in claim 11 in which the mounting for said carriage is located on a vehicle, said vehicle carrying a cradle for said bolts, means being provided for transferring the bolts from said upper face of said boom and carriage to said cradle.

13. A machine as claimed in claim 11 in which said boom is longitudinally recessed at its end adjacent said track, said recess being provided with retractable arms adapted to grip said tree before bolt shearing and retract the severed bolt such that the upper end of said bolt contacts said conveying means and the other end of said bolt is accommodated in a bucket located at the bottom of said track, said bucket being adapted to move upwardly along said track whereby to lift said bolt onto said conveying means.

References Cited
UNITED STATES PATENTS

| | | |
|---|---|---|
| 2,882,941 | 1/1959 | Pope. |
| 2,948,311 | 8/1960 | McCollum. |
| 3,074,446 | 1/1963 | Earl. |
| 3,074,447 | 1/1963 | Bombardier. |
| 3,102,563 | 9/1963 | Horncastle. |
| 3,140,736 | 7/1964 | Propst. |
| 3,183,954 | 5/1965 | Larson. |
| 3,269,436 | 8/1966 | Moore _____ 144—34 X |
| 3,294,131 | 12/1966 | Larson _____ 144—34 X |

WILLIAM W. DYER, Jr., *Primary Examiner.*

W. D. BRAY, *Assistant Examiner.*